United States Patent [19]

Newton

[11] 4,252,109
[45] Feb. 24, 1981

[54] MULTI-PURPOSE SOLAR PANEL BOX ASSEMBLY

[75] Inventor: T. Lawrence Newton, Atherton, Calif.

[73] Assignee: Sunburst Solar Energy, Inc., Menlo Park, Calif.

[21] Appl. No.: 26,835

[22] Filed: Apr. 4, 1979

[51] Int. Cl.³ .............................................. F24J 3/02
[52] U.S. Cl. .................................... 126/450; 126/447
[58] Field of Search ............... 126/450, 446, 447, 448, 126/442; 52/398, 400, 824, 825, 202

[56] References Cited

U.S. PATENT DOCUMENTS

| 4,098,259 | 7/1978 | Barber, Jr. et al. | 126/450 |
| 4,114,595 | 9/1978 | Barker | 126/450 |
| 4,123,883 | 11/1978 | Barber, Jr. et al. | 126/450 |
| 4,131,111 | 12/1978 | Hopper | 126/450 |
| 4,167,178 | 9/1979 | Brussels | 126/450 |

FOREIGN PATENT DOCUMENTS

| 2605927 | 3/1977 | Fed. Rep. of Germany | 126/446 |
| 2706286 | 8/1978 | Fed. Rep. of Germany | 126/450 |
| 2000860 | 1/1979 | United Kingdom | 126/450 |

Primary Examiner—James C. Yeung
Attorney, Agent, or Firm—Julian Caplan

[57] ABSTRACT

The solar-exposed cover portion of conventional solar panel boxes are subject to variation depending upon customer choice, cost, heat insulation requirements and other factors, whereas the interiors of the boxes are standard. Thus, the cover portion may be a panel of plastic, or glass, or a combination of glass and plastic of varying thicknesses. The interior has a thick bed of insulation, headers and tubes all surrounded by a frame. Two different retainers are provided which may be attached around the side edges of the frame and used individually or in combination to accommodate plastic panels, glass or a combination of glass and plastic sheeting. The connecting pipes from the headers to the exterior of the box are provided with seals. By removing the retainers, seals and glass and/or plastic, the headers and tubes may be lifted out of the box for repair or replacement without removing the box.

8 Claims, 6 Drawing Figures

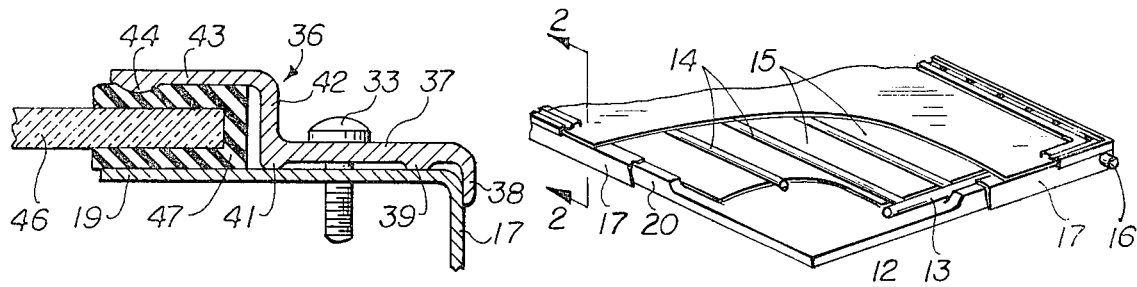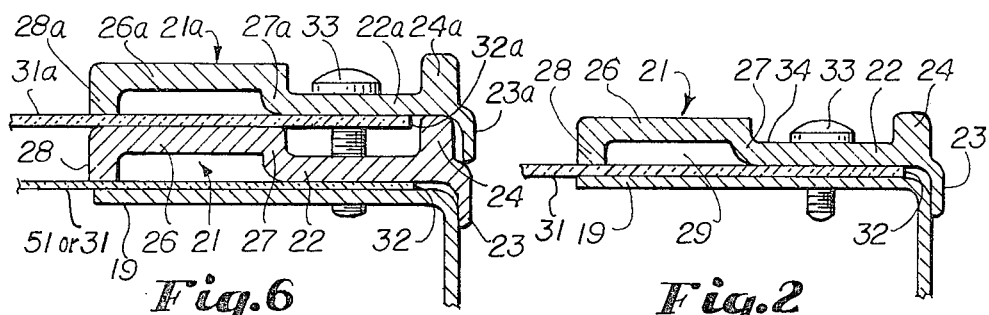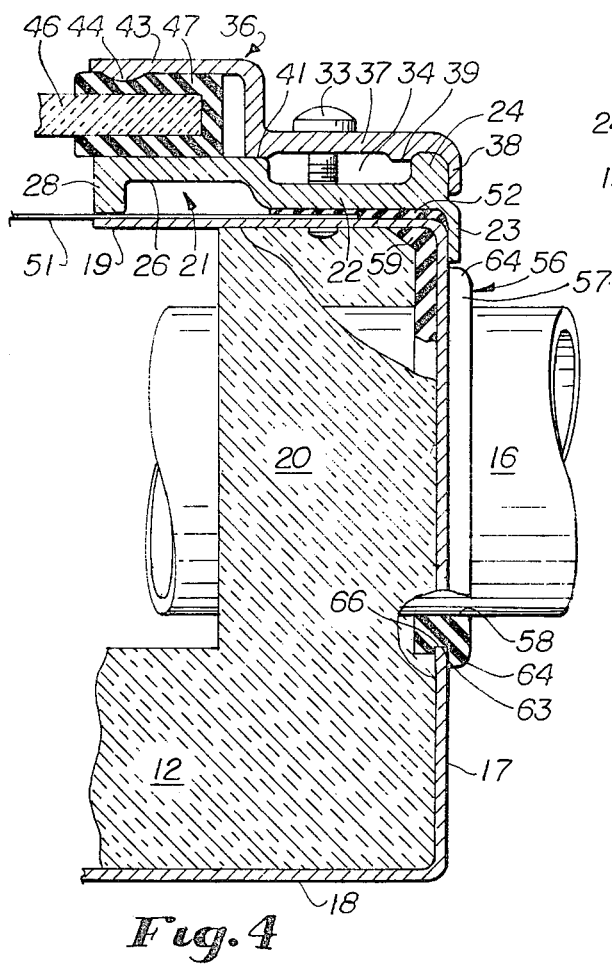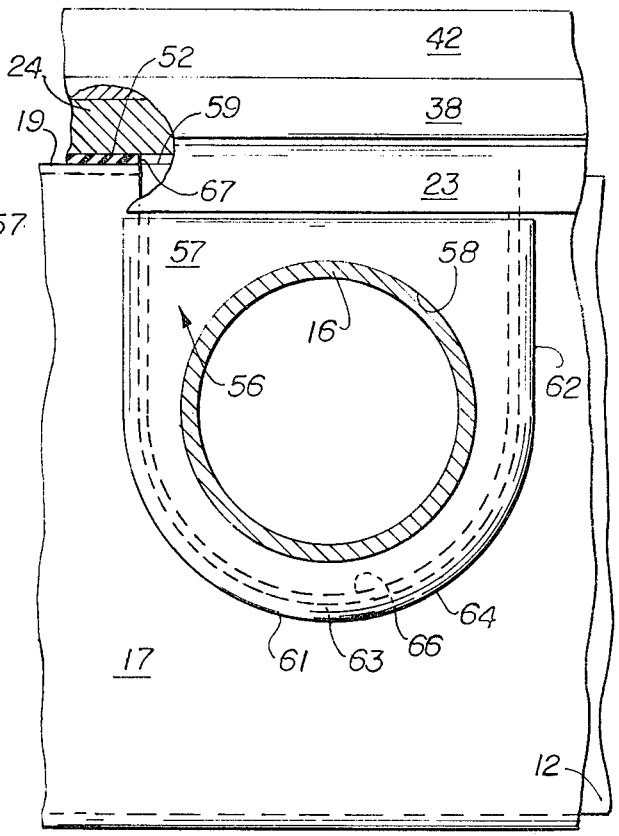

MULTI-PURPOSE SOLAR PANEL BOX ASSEMBLY

This invention relates to a new and improved multi-purpose solar panel box assembly. Solar panels commonly used for heating water for various purposes are generally rectangular, shallow boxes. In each box is an insulated bottom on which is superimposed an absorber plate or coil system consisting of headers and interconnecting tubes. Inlet and outlet pipes for the headers pass through the sides of the box and are connected into the piping system of the installation. The top of the box is closed off with a cover which is sealed to the sides of the box with an air-tight seal to prevent thermal losses. There are several different types of covers conventionally used, and heretofore boxes have been specifically designed to accept specific types of covers or elaborate fittings for the covers have been required. It is a principal purpose of the present invention to make it possible to use a single box construction with which several different styles of covers may be used depending upon the desire of the customer and the needs of the particular installation.

The function of the cover for the box is to permit solar heat to be transmitted to the absorber plate or coil and yet to retain solar heat within the box. One commonly used cover is a plastic panel which may be coated with various types of material. Such panels are thin compared with another common cover of tempered glass, the edges of which are protected and sealed by a plastic channel. The thickness of the glass and particularly the thickness of the channel seal considerably exceeds the thickness of a plastic panel and hence requires a different retainer. Plastic material made in the form of a hollow tube extrusion of approximately the same thickness as tempered glass may be used in the same retainer as that for glass. Still another common cover employs a sheet of glass spaced above a thin sheet of a plastic material such as Teflon which may, or may not, be coated with various materials and which is usually taped around the edges for resistance against tearing. Here again, a different retaining means for the glass and for the plastic sheet is necessary.

In accordance with the present invention, two different retainers are used individually or in combination. One retainer is screwed to the edge of the frame for the box and captures the edge of the plastic panel. A second type of retainer is screwed to the edge of the frame and captures against the frame the channel seal surrounding the edge of the glass pane. By combining the two retainers and placing the second on top of the first, a sheet of plastic may be secured between the said frame of the box and the first retainer and the glass and its channel seal secured between the second retainer and the first retainer, thereby spacing the glass panel above the plastic sheet.

In addition, the first retainer is constructed so that a pair may be stacked to hold two pieces of plastic. Both pieces can be of varying thicknesses with the inner piece normally being plastic film and the outer piece thicker and more resistant to the elements.

Accordingly, one of the advantages of the present invention is considerable economy in the construction of the box since the type of cover which is ultimately used in the completed panel does not affect the box construction. The customer may specify a variety of different covers for the standard box. After the box is installed at the site, the covers may even be changed without removing the box from its ultimte location.

Another feature of the invention is the fact that the covers may be removed and the absorber plate or coil consisting of headers, tubing and inlet and outlet may be replaced or repaired without removing the box from its site. It will be understood that frequently boxes are installed on roofs or other locations which are difficult of access. The fact that it is possible to leave the heavy box in place and only remove the absorber plate or coil is a considerable convenience and economy in repair and replacement.

Another feature of the invention is the fact that the retainers may be made of extrusions of aluminum or other suitable materials and are relatively inexpensive as compared with other cover retainers.

A still further feature of the invention is the fact that the retainers afford a good seal of the covers to the sides of the box thereby reducing thermal losses.

A still further feature of the invention is the fact that the heads of the screws which hold the retainers to the frame are protected in the sense that portions of the retainers project above the heads of the screws. Hence, when panels are stacked one on the other during transportation and storage, the heads of the screws do not mar, scratch or otherwise damage superimposed panels.

Heretofore, the inlet and outlet pipes for the headers have been passed through holes in the sides of the frame. Assembly and disassembly involves tilting the coil assembly to insert or remove the inlet and outlet pipes from the holes. In accordance with the present invention, a notch is cut in the side of the frame extending from the top of the frame a considerable distance down the side. Hence the solar absorber assembly need merely be dropped into the box prior to installation of the cover or the solar absorber assembly may be lifted from the box for repair or replacement after the cover has been removed. To prevent thermal losses through the notch, a header seal is provided which has a hole which slips over the inlet and outlet pipe and is shaped to fill the notch which has been cut in the frame in the box. Preferably, the bottom and side edges of the seal are formed with a groove in which the edges of the frame surrounding the notch are captured. Further, a flange is formed in the top of the seal which is engaged by one or the other of the retainers for the cover members further to enhance the thermal seal to prevent loss through the notch in the side of the frame.

Other objects of the present invention will become apparent upon reading the following specification and referring to the accompanying drawings in which similar characters of reference represent corresponding parts in each of the several views.

In the drawings:

FIG. 1 is a schematic perspective view of a typical panel construction with which the present invention may be employed.

FIG. 2 is an enlarged frangmentary sectional view taken substantially along the line 2—2 of FIG. 1 showing use of one type of retainer of the present invention.

FIG. 3 is a view similar to FIG. 2 showing a different type of retainer in accordance with the present invention.

FIG. 4 is a view similar to FIG. 2 showing both retainers used and also showing a portion of the box construction.

FIG. 5 is an elevational view from the right of FIG. 4.

FIG. 6 is a view similar to FIG. 4 showing two identical retainers of the type of FIG. 2 used in accordance with the present invention.

A typical panel box 11 is illustrated herein. Such a box has a bed, or bottom, of insulation material 12 which is relatively thick and has marginal upstanding rims 20 around the sides. The upper surface of the insulation is preferably aluminum foil. Disposed above the insulation 12 is a solar absorber assembly consisting of headers 13 and interconnecting tubes 14 through which the water to be heated circulates. Fins 15 are in close thermal contact with the tubes 14. Inlet and outlet pipes 16 for the headers 13 project out through the side frame 17. Box 11 is usually rectangular in shape, and the sides of the frame 17 formed of aluminum or other strips extend around the perimeter. A bottom in-turn flange of side 17 fits under the insulation 12 and the top in-turned flange 19 fits under the covers and retainers therefor hereinafter described and over the rim 20.

A feature of the invention is the use of two retainers 20 which may be used individually or in combinations depending upon the covers to be employed. First retainer 21 (FIG. 2) has a base 22 which fits on top of flange 19. Extending down from base 22 is outer edge 23 which fits against the rounded top corner of side 17. Projecting up from the outer edge of base 22 is a protective rim 24. Upward offset 16 parallel to base 22 is interconnected with the inner edge thereof by a substantially vertical short leg 27. The inner edge of offset 26 has a down-turned inner edge 28. Thus, there is a cavity 29 below offset 26 between leg 27 and edge 28. The first retainer 21 may be formed of an aluminum extrusions, preferably annodized. Other suitable materials may be used.

Directing attention to FIG. 2, first retainer 21 is employed to secure a cover which consists of a relatively thin plastic panel 31, the outer edge of which extends under the base 22. A sheet metal screw 33 extends through pre-formed holes in base 22 and panel 31 and is screwed into the in-turned flange 19 of side 17. It will be noted that the head of screw 33 is recessed into the depression 34 between protective rim 24 and offset 26. Hence, when panels are stacked on top of each other for transportation and storage, the screw 33 does not scratch or otherwise mar the adjacent panel. The area of contact of the bottom of base 22 plus the contact of the bottom of the outer edge 28 against the panel 31 forces it into firm engagement with top flange 19 affording a good thermal seal.

Directing attention now to FIG. 3, second retainer 36 is also formed as an aluminum extrusion, anodized or otherwise surface treated. Other suitable materials may be used. Second retainer 36 has a base 37 having a down-turned outer edge 38 which fits around the top corner of the side of frame 17 in the installation shown in FIG. 2. Inward of edge 38 is a short downward extending outer rib 39, and at the inner edge of base 37 is an inner rib 41. Extending upward from inner edge of base 37 in substantial alignment with inner rib 41 is leg 42 which is considerably higher than the corresponding leg 27 of first retainer 21. Upper flange 43 extends inward from leg 42 and on its underside adjacent the outer edge there is a rounded downward projecting bead 44.

An installation employing second retainer 36 is illustrated in FIG. 3. The cover in this installation is a pane of tempered glass or extruded plastic 46, the outer edge of which is protected by a channel seal strip 47 of a resilient plastic material. The bead 44 presses into the top of channel 47 and insures a tight seal of the second retainer 36 against the seal 46 and the bottom of the seal 47 against the side flange 19.

In the installation of FIG. 4, both retainers 21 and 36 are used, the retainer 36 fitting on top of the retainer 21. It will be noted that outer edge 38 fits around the top and outer edge of rim 24, whereas rib 39 fits against the inner edge of rim 24. In this installation, a thin sheet of plastic 51 fits over the top of flange 19 and is pressed against the flange by the underside of base 22 and outer edge 28. Preferably, the edge of sheet 21 is reinforced by tape 52 which has an adhesive coating. The second portion of the cover is a glass pane or extruded plastic 46 with a channel seal strip 47. The latter is captured between the top surface of offset 26 and upper flange 43. Inner rib 41 bears against the top of offset 26 to provide a thermal seal between the retainer 21 and 36. The screw 33 extends through pre-formed holes in base 37 and base 22 and is threaded into the flange 19.

FIG. 5 illustrates use of a pair of retainers 21, 21a, which are identical to the retainer shown in FIG. 2. Lower plastic film or sheet 31 is secured by retainer 21 as in FIG. 2 (or the lower film 19 of FIG. 4). Upper plastic sheet 31a is parallel to and spaced above film 19 or sheet 31 and is retained by retainer 21a. Rim 24 fits against the underside of base 22a and inside outer edge 23a.

In a preferred form of the invention, a notch 66 having an arcuate bottom margin is cut into side 17 and a corresponding notch 67 cut into flange 19. Through the notch 66 extends the inlet or outlet 16 for the header 13. To prevent escape of heat through notch 66, header seal 56 is employed. Seal 56 has a side 57 formed with a hole 58 of the same diameter as the outside diameter of pipe 16. At its top it has an inward projecting flange 59 which engages against the underside of base 22 or base 37 depending upon whether the installation is as is shown either in FIGS. 2 or 3 or as is shown in FIG. 4. Preferably, there is an arcuate bottom edge 61 of side 57 corresponding to the shape of the bottom of notch 66, and there are substantially vertical side edges 62. Edges 62 and 61 are formed with a groove 63 which is about the same width as the thickness of the panel box frame 17. Rounded corners 64 are formed in the exposed edges of the seal 56. In use, the pipe 16 is slipped through the hole 58 and the grooves 63 receive the edges of the notch 66. Flange 59 is installed so as to bear against the underside of the retainers 21 or 36.

When it is necessary to repair or inspect the panel box, the screws 33 are removed, permitting removal of retainers 21 and 36 as well as the panel 31, pane 46 and plastic sheet 51 as the case may be. The absorber assembly is removed merely by lifting it upward, the header seal 56 sliding out of the notch 66. A new absorber coil assembly may be installed without removing the panel-box from the site. The parts are reassembled after the new absorber assembly is installed. The same cover may be replaced if it is in good condition. If one of the members of the cover is damaged it may be replaced. On the other hand, if the user wishes to substitute a new cover, the same may be installed by furnishing an additional retainer 21 or 36 to achieve the structure shown in FIGS. 2, 3 or 4.

The terms "up" and "down" and derivatives thereof are used in the accompanying claims in the sense of FIG. 4; the terms "in" and "out" and derivatives are used in the sense of extending to left and right, respectively, in said orientation of FIG. 4.

What is claimed is:

1. A solar panel construction comprising an open top box, said box having sheet metal sides, each said side having an inturned top flange, said side and flange coinciding at a corner, said box being open inward of the inner termini of said flanges; a first cover for the open top of said box; first retaining means for said first cover, said first retaining means having a first base having a flat bottom supported by said flange, a down-turned first outer edge extending outside said corner and engaging said side adjacent said corner, an upturned rim extending from said first base inward of said first outer edge, an upward-extending first offset inward of said first base, a first inner edge inward of said first offset engaging said first cover and securing said first cover against said flange,
- a second cover above said first cover, the margins of said second cover resting on said upward offset; second retaining means for said second cover, said second retaining means having a second base resting partially on said first rim and partially on said first offset, a downturned second outer edge engaging the outside of said rim, and an upward-extending second offset engaging said second cover;
- and securing means securing said second retaining means and said flange together.

2. A construction according to claim 1 in which said second cover comprises a pane of transparent material having a resilient channel around its marginal edges, said channel fitting between said second offset and said first offset.

3. A construction according to claim 2 in which the inner edge of said second offset has a downward bead resiliently deforming the top of said channel.

4. A construction according to claim 2 in which said second offset is higher than said second base, said securing means comprising a screw having a head engaging the top of said second base and fitting through said second base, said first base and a portion of said flange.

5. A construction according to claim 1 in which said second retaining means has an inner edge having a downward extending portion bearing against said second cover.

6. A solar panel construction comprising a box having upstanding sheet-metal sides and an open top, each said side having an in-turned flange, a solar absorber construction within said box, a cover for the open top of said box resting on said flange, retaining means for said cover, said retaining means having a flat base, a down-turned outer edge for said base fitting around the upper edge of said side, an inner edge along the inner margin of said base shaped to engage the top of said cover, securing means securing said retaining means to said flange, a notch cut in said side from the top of said side at least part way to the bottom of said side, said absorber construction having a pipe extending through said notch for connection to the exterior of said panel construction and which further comprises a seal for said pipe, said seal being apertured to fit around the outside of said pipe and having edges to seal against the margins of said notch, the top of said seal sealing against said retaining means.

7. A construction according to claim 6 in which the upper edge of said seal is formed with an in-turned second flange, said second flange engaging the underside of said retaining means and the inside of said outer edge of said base.

8. A construction according to claim 6 in which the margin of said seal is formed with a groove, the margin of said notch being received in said groove.

* * * * *